(No Model.)
W. G. POTTER.
PULLEY.
No. 425,827. Patented Apr. 15, 1890.
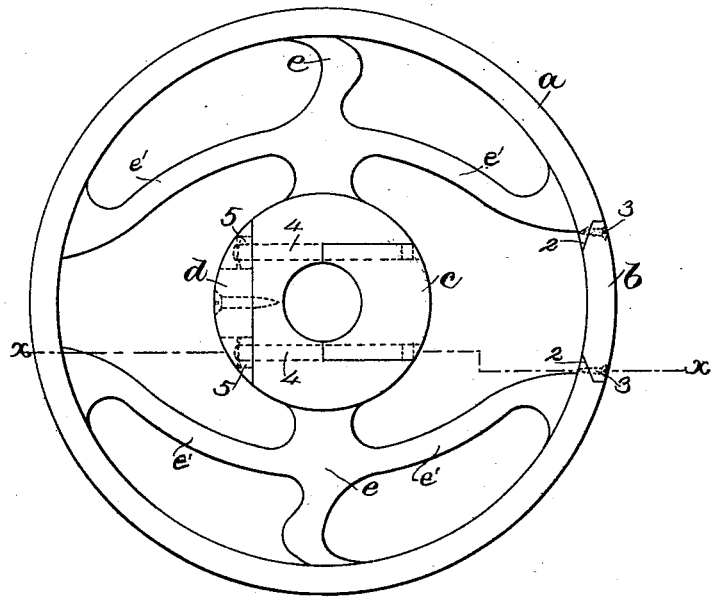
FIG. 1.
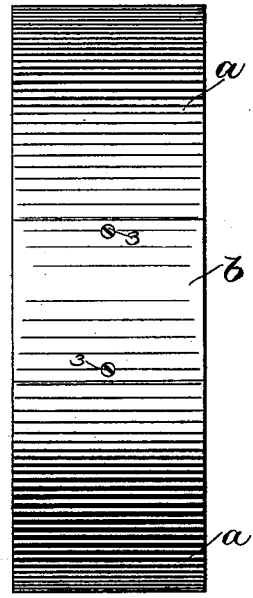
FIG. 2.
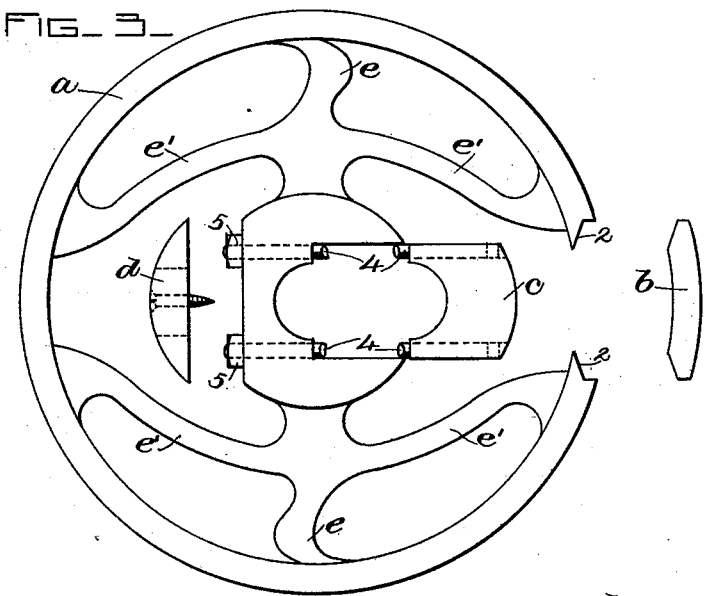
FIG. 3.
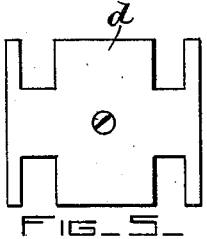
FIG. 5.
FIG. 4.
WITNESSES
Howard F. Eaton.
Edgar A. Goddis
INVENTOR
William G. Potter:
By Crosby & Gregory
att'ys

UNITED STATES PATENT OFFICE.

WILLIAM G. POTTER, OF MARBLEHEAD, MASSACHUSETTS.

PULLEY.

SPECIFICATION forming part of Letters Patent No. 425,827, dated April 15, 1890.

Application filed September 14, 1889. Serial No. 323,918. (No model.)

*To all whom it may concern:*

Be it known that I, WILLIAM G. POTTER, of Marblehead, county of Essex, State of Massachusetts, have invented an Improvement in Pulleys, of which the following description, in connection with the accompanying drawings, is a specification, like letters and figures on the drawings representing like parts.

This invention has for its object to improve the construction of that class of pulleys adapted to be applied to shafting without the necessity of cutting it or taking it down, such pulleys being commonly called "divided" pulleys.

In accordance with this invention the line of severance of the small part or section which is removed from the rim to admit the shaft is such that the section may be secured in position by screws or other suitable fastenings without breaking or interrupting the continuity or smooth surface of the rim externally or internally; also, the part or segment removed from the hub to admit the shaft is independent of the other parts of the pulley—that is, independent of the spokes—and the means employed for fastening the said part or segment in position are such as to leave no projection to break the continuity or smooth surface of the hub.

Figure 1 shows in side elevation a pulley embodying this invention; Fig. 2, a front view of the pulley shown in Fig. 1; Fig. 3, a side elevation of the pulley, parts of the rim and hub being removed; Fig. 4, a section of the pulley shown in Fig. 1, taken on the dotted line $x\ x$; and Fig. 5, a detail to be referred to.

The rim of the pulley has a small part or portion $b$ removable or detachable, the line of severance at each end being diagonal for a part or the whole distance, as represented at 2, Figs. 1 and 3. Such diagonal lines permit the part $b$ to be secured in position by means of screws 3, so that the continuity of the rim is unbroken externally or internally. The part or segment $c$, which is removed from the hub, is independent of any other part of the pulley.

Bolts 4 (see dotted line, Figs. 1 and 3) pass through the hub and the part or segment $c$, holding it in position, the part or segment $c$ having countersinks to receive the heads of the bolts.

In order to provide suitable recesses for the nuts which are turned on the bolt and to insure sufficient space in which to turn the nuts, I have cut or slabbed off the hub at one side directly opposite the part or segment $c$ on a chord, the part or segment $d$ so removed presenting a flat face, so that the nuts 5 may be turned easily.

The part or segment $d$ (see Fig. 5) has quadrangular recesses or notches at its ends to receive the nuts, so that a smooth-surfaced hub may be presented, or one devoid of any projections, while the shape of the recesses prevents the nuts from turning.

The part $d$ is secured to the hub by a screw or other suitable fastening.

The spokes $e$ of the pulley are formed at each side of the hub, as represented, connecting the hub and rim, and spokes $e'$ connect the said spokes $e$ and rim, so that the parts $b$ and $c$ may be readily removed, when desired, and the strength of the pulley is not dependent in any way on the removable parts.

The shaft-receiving hole is bored with the part or segment $c$ in place, to thereby form a truly-circular hole for a tight fit on the shaft, and when it is intended the pulley to be used as a loose pulley the part or segment $c$ is placed in position, but slightly separated from the other part, so that a larger hole may be bored.

The invention as above described and as shown is as well applicable to wheels of various kinds, more particularly heavy wheels, as fly-wheels and the like, so I do not desire to limit myself to the particular use to which it is put.

I claim—

1. A pulley or wheel having a part or section $b$ of the rim removable, the line of severance being diagonal for a part of the whole distance, as 2, combined with fastenings for the said removable part or section extended through such diagonal portion, substantially as described.

2. A pulley or wheel having a part or segment c of the hub removable, combined with a part, as d, removable from the opposite side of the hub, and bolts for securing the parts together, said part d having quadrangular notches for the nuts of the bolts, the notches preventing the said nuts from turning, substantially as described.

In testimony whereof I have signed my name to this specification in the presence of two subscribing witnesses.

WILLIAM G. POTTER.

Witnesses:
THOMAS INGALLS, Jr.,
JOHN F. VARRELL.